(12) United States Patent
Stephenson (10) Patent No.: US 11,613,426 B2
(45) Date of Patent: Mar. 28, 2023

(54) CORRELATOR AND CORRELATOR SYSTEM FOR GUIDING A VEHICLE WHEEL ONTO A VEHICLE CONVEYOR

(71) Applicant: Stephenson Technologies Inc., Barrie (CA)

(72) Inventor: Robert Roy Stephenson, Barrie (CA)

(73) Assignee: Stephenson Technologies Inc., Barrie (CA)

( * ) Notice: Subject to any disclaimer, the term of this patent is extended or adjusted under 35 U.S.C. 154(b) by 0 days.

(21) Appl. No.: 17/455,565

(22) Filed: Nov. 18, 2021

(65) Prior Publication Data

US 2022/0153525 A1 May 19, 2022

Related U.S. Application Data

(60) Provisional application No. 63/123,272, filed on Dec. 9, 2020, provisional application No. 63/115,372, filed on Nov. 18, 2020.

(51) Int. Cl.
*B65G 21/20* (2006.01)
*B65G 45/02* (2006.01)
*B65G 21/10* (2006.01)
*B65G 67/30* (2006.01)
*B60S 3/00* (2006.01)

(52) U.S. Cl.
CPC ......... *B65G 21/2072* (2013.01); *B65G 21/10* (2013.01); *B65G 45/02* (2013.01); *B65G 67/30* (2013.01); *B60S 3/004* (2013.01); *B65G 2201/0294* (2013.01)

(58) Field of Classification Search
CPC .... B65G 21/2072; B65G 21/10; B65G 45/02; B65G 67/30; B65G 2201/0294; B65G 15/12; B65G 47/66; B60S 3/004
See application file for complete search history.

(56) References Cited

U.S. PATENT DOCUMENTS 7,302,894 B2 * 12/2007 Belanger ................. B60S 3/004
104/162
7,571,682 B2 * 8/2009 Bianco .................... B60S 3/004
104/242
8,215,476 B2 * 7/2012 Ennis ...................... B60S 3/004
414/257

(Continued)

*Primary Examiner* — Mark A Deuble
(74) *Attorney, Agent, or Firm* — Laurence A. Greenberg; Werner H. Stemer; Ralph E. Locher (57) ABSTRACT

In an aspect, there is provided a correlator for guiding a vehicle onto a vehicle conveyor. The correlator includes a wheel support surface defining a receiving end of the correlator and a conveyor-interfacing end of the correlator. The wheel support surface is positioned to support a wheel of the vehicle as the wheel rolls thereon. The correlator further includes at least one guide structure positioned to guide a wheel of the vehicle laterally during travel of the wheel on the wheel support surface from the receiving end towards the conveyor-interfacing end. The wheel support surface has a surface region having surface properties selected such that a coefficient of friction between the surface region and tire rubber is sufficiently low to prevent the wheel from having sufficient traction on the surface region to enable climbing of the wheel onto the at least one guide structure.

26 Claims, 5 Drawing Sheets

(56) References Cited

U.S. PATENT DOCUMENTS

| | | | |
|---|---|---|---|
| 8,783,191 B2* | 7/2014 | Auer | B60S 3/004 |
| | | | 104/165 |
| 9,371,059 B2* | 6/2016 | MacNeil | B60S 3/004 |
| 11,053,079 B2* | 7/2021 | Boelryk | B60S 3/004 |

* cited by examiner

CORRELATOR AND CORRELATOR SYSTEM FOR GUIDING A VEHICLE WHEEL ONTO A VEHICLE CONVEYOR

CROSS-REFERENCE TO RELATED APPLICATIONS

The present application claims the benefit of U.S. Provisional Application Nos. 63/115,372 filed Nov. 18, 2020, and 63/123,272, filed Dec. 9, 2020, the contents of both of which are incorporated herein in their entireties.

FIELD

The specification relates generally to conveyors, and in particular to a correlator and a correlator system for guiding a vehicle wheel onto a vehicle conveyor.

BACKGROUND OF THE DISCLOSURE

Correlators for guiding a vehicle wheel onto a vehicle conveyor for vehicle washes and the like are known. The vehicle conveyor can be one or more chain drives, endless belts, rollers, or any other suitable means for conveying a vehicle along a vehicle path. For example, in a vehicle wash, the vehicle path can be a path along which are positioned a series of exterior washing and/or treatment apparatuses.

In order to align a vehicle with a desired orientation and position for mounting the vehicle onto the vehicle conveyor, a correlator can be employed to guide or funnel the wheel of a vehicle. Correlators have a receiving end at which a wheel of a vehicle is received, and a conveyor-interfacing end positioned adjacent to a mounting end of the vehicle conveyor. At least one guide structure is positioned and oriented to guide the wheel of a vehicle onto the vehicle conveyor. Typically, such correlators include two guide structures in the form of rollers rotatably mounted on a support structure to enable rotation of the rollers about a rotation axis that is generally horizontal. The two guide structures are positioned on opposite lateral sides and are oriented to form a funnel that restricts deviation from a target lateral range for a wheel position and orientation towards the conveyor-interfacing end of the correlator. Presently, however, since the friction between the tire and the surface between the guide structures is significant, the tire has the ability to climb up onto the guide structures instead of being steered by them, thereby reducing the effectiveness of the correlator.

In order to inhibit a tire's ability to push against the surface over which it is travelling to climb up on the guide structures, mechanical arrangements have been employed. In one example, rollers having a rotational axis aligned with a longitudinal axis of a vehicle conveyor are positioned between guide rails and provide a surface over which the wheel of the vehicle travels. Lateral correction of the position of the wheel is facilitated as friction between the wheel and the surface over which it is travelling in the lateral direction is reduced. In another example, a surface patch upon which a wheel of a car is positioned between guides is movable at least longitudinally and laterally to enable adjustment of the orientation and position of the wheel as it is being guided toward a target position, and biased to enable the surface patch to return to a neutral position after the wheel has moved on. As vehicle conveyors are generally installed at ground level, however, these mechanical arrangements need to be buried below ground level, thereby complicating their installation. Further, servicing of such mechanical arrangements can be non-trivial as the various components that are buried may be difficult to access.

SUMMARY OF THE DISCLOSURE

In an aspect, there is provided a correlator for guiding a vehicle onto a vehicle conveyor having a conveyor axis. The correlator includes a wheel support surface defining a receiving end of the correlator and a conveyor-interfacing end of the correlator that is aligned with the vehicle conveyor. The wheel support surface is positioned to support a wheel of the vehicle as the wheel rolls thereon from the receiving end towards the conveyor-interfacing end. The correlator further includes at least one guide structure positioned to guide a wheel of the vehicle laterally during travel of the wheel on the wheel support surface from the receiving end towards the conveyor-interfacing end. The wheel support surface has a surface region having surface properties selected such that a coefficient of friction between the surface region and tire rubber is sufficiently low to prevent the wheel from having sufficient traction on the surface region to enable climbing of the wheel onto the at least one guide structure.

The surface region can have surface properties selected such that the coefficient of friction is lower than 0.3. The surface region can have surface properties selected such that the coefficient of friction is lower than 0.25. The surface region can have surface properties selected such that the coefficient of friction is lower than 0.2.

The surface region can be at least partially made of polytetrafluoroethylene.

The surface region can be at least partially made of a polymer. The polymer may include an ultra high molecular weight polyethylene (UHMW). An additive can be added to the UHMW to decrease the coefficient of friction of the surface region.

The correlator can further include a lubrication arrangement for lubricating the surface region. The lubrication arrangement can include at least one nozzle positioned to spray a lubricating fluid onto the wheel support surface. The lubrication arrangement can include at least one aperture in the wheel support surface in fluid communication with a lubricating fluid source configured to dispense a lubricating fluid through the at least one aperture.

The lubricating fluid can include a surfactant.

In another aspect, there is provided a correlator for guiding a vehicle onto a vehicle conveyor having a conveyor axis. The correlator includes a wheel support surface defining a receiving end of the correlator and a conveyor-interfacing end of the correlator. The wheel support surface is positioned to support a wheel of the vehicle as the wheel rolls thereon from the receiving end towards the conveyor-interfacing end. The correlator further includes at least one guide structure positioned to guide a wheel of the vehicle laterally during travel of the wheel on the wheel support surface from the receiving end towards the conveyor-interfacing end. The correlator further includes a lubrication arrangement positioned to supply a lubricating fluid on top of a surface region of the wheel support surface, such that a coefficient of friction between the surface region and tire rubber is sufficiently low to prevent the wheel from having sufficient traction on the surface region to enable climbing of the wheel onto the at least one guide structure.

The lubrication arrangement can include at least one nozzle in fluid communication with a lubricating fluid source and positioned to spray the lubricating fluid onto the surface region.

The lubrication arrangement can include at least one aperture in the surface region in fluid communication with a lubricating fluid source configured to dispense the lubricating fluid through the at least one aperture.

The lubricating fluid can include a surfactant.

In a further aspect, there is provided a correlator system for guiding a vehicle onto a vehicle conveyor having a conveyor axis. The vehicle has at least a first wheel on a first lateral side of the vehicle, and a second wheel on a second lateral side of the vehicle. The correlator system includes a correlator having a receiving end and a conveyor-interfacing end that is aligned with the vehicle conveyor, and at least one guide structure positioned to guide the first wheel of the vehicle laterally during rolling of the first wheel from the receiving end towards the conveyor-interfacing end. The correlator system further includes a second wheel support surface positioned to support the second wheel as the first wheel rolls from the receiving end of the correlator towards the conveyor-interfacing end of the correlator. The second wheel support surface has a surface region having surface properties selected such that a coefficient of friction between the surface region and tire rubber is sufficiently low to prevent the second wheel from having sufficient traction on the surface region to enable climbing of the first wheel onto the at least one guide structure.

The surface region can have surface properties selected such that the surface region and tire rubber have a coefficient of friction that is lower than 0.3. The surface region can have surface properties selected such that the surface region and tire rubber have a coefficient of friction that is lower than 0.25. The surface region can have surface properties selected such that the surface region and tire rubber have a coefficient of friction that is lower than 0.2.

The surface region can be at least partially made of polytetrafluoroethylene.

The surface region can be at least partially made of a polymer. The polymer can be an ultra high molecular weight polyethylene (UHMW). An additive can be added to the UHMW to decrease the coefficient of friction of the surface region.

The correlator system can further include a lubrication system for lubricating the wheel support surface.

The lubricating system can include at least one nozzle positioned to spray a lubricating fluid onto the wheel support surface region.

The lubricating fluid can include a surfactant.

In yet another aspect, there is provided a correlator system for guiding a vehicle onto a vehicle conveyor having a conveyor axis. The vehicle has at least a first wheel on a first lateral side of the vehicle, and a second wheel on a second lateral side of the vehicle. The correlator system includes a correlator having a receiving end and a conveyor-interfacing end that is aligned with the vehicle conveyor, and at least one guide structure positioned to guide the first wheel of the vehicle laterally during rolling of the first wheel from the receiving end towards the conveyor-interfacing end. The correlator system further includes a second wheel support surface positioned to support the second wheel as the first wheel rolls from the receiving end of the correlator towards the conveyor-interfacing end of the correlator. The correlator system further includes a lubrication arrangement positioned to supply a lubricating fluid on top of a surface region of the second wheel support surface, such that a coefficient of friction between the surface region and tire rubber is sufficiently low to prevent the second wheel from having sufficient traction on the surface region to enable climbing of the first wheel onto the at least one guide structure.

The lubrication arrangement can include at least one nozzle in fluid communication with a lubricating fluid source and positioned to spray the lubricating fluid onto the surface region.

The lubricating fluid can include a surfactant.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

A correlator for guiding a vehicle wheel onto a vehicle conveyor, and a correlator system are disclosed. The correlator includes at least one guide structure, and a wheel support surface having a surface region. At least the top surface of the wheel support surface can be made of a material that has a coefficient of friction with tire rubber of less than a selected value to facilitate lateral slippage of the wheels of a vehicle and to inhibit sufficient friction between the tire and the surface region in order to prevent the vehicle wheel from climbing onto the at least one guide structure positioned along the sides of the surface region. The wheel support surface can be provided by a deck that is relatively thin to enable its installation over an existing surface in front of the vehicle conveyor, thus avoiding the need to dig a trench to accommodate its installation. Further, servicing of the wheel support surface can be simplified as there may be no mechanical arrangements that need to be dismantled.

Additionally or alternatively, at least one lubrication arrangement can be positioned to supply a lubricating fluid on top of the surface region to reduce the coefficient of friction between the surface region and the tires of the vehicle. In some instances, the solutions can be relatively thin and thus can be installed atop of an existing surface, thereby avoiding having to bury components of the correlator below surface. Further, as the UHMW deck has no mechanical elements, its servicing is facilitated.

Figure 1:
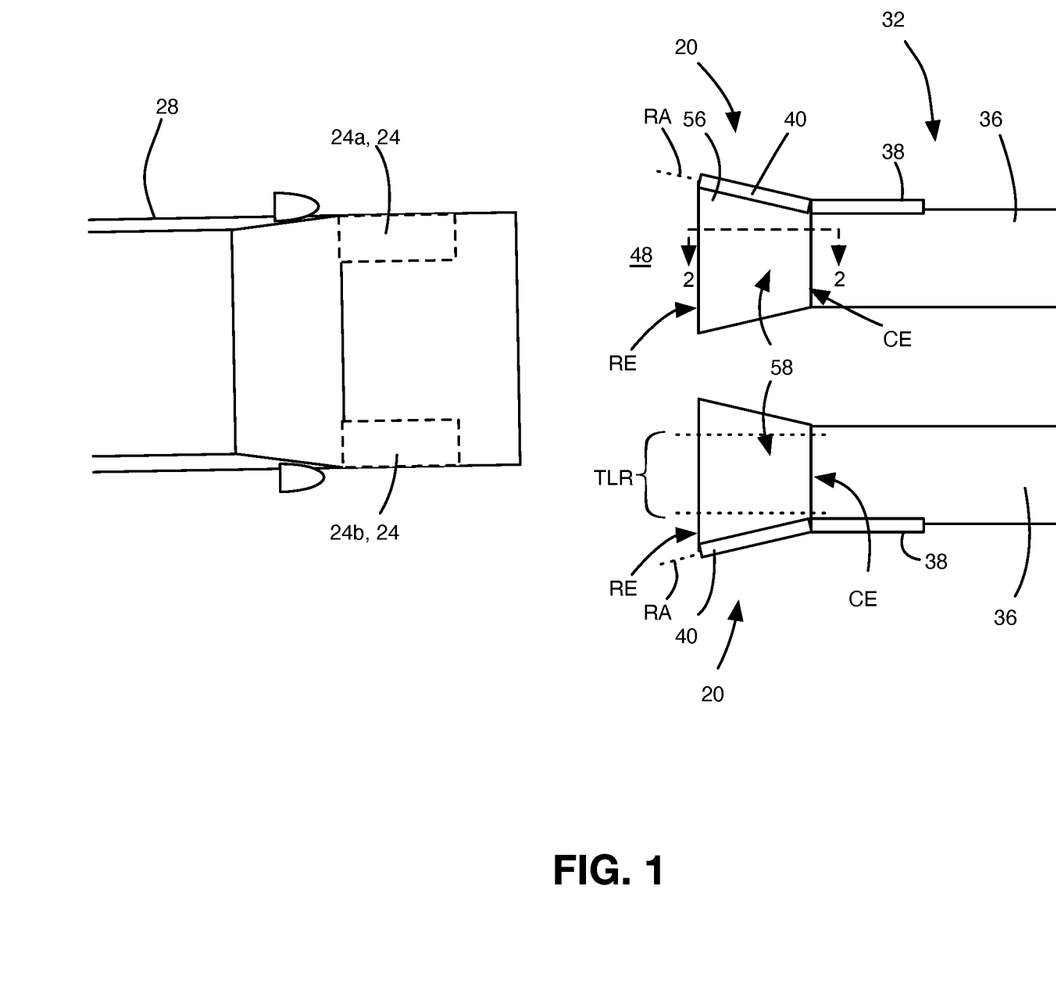
FIG. 1 shows a top schematic view of a vehicle conveyor having two endless belts, and a correlator in accordance with an embodiment positioned to guide the wheels of the vehicle onto each of the endless belts.

FIG. 1 shows a pair of correlators 20 in accordance with an embodiment positioned to guide wheels 24a, 24b (alternatively, collectively referred to hereinafter as wheels 24) of a vehicle 28 onto a vehicle conveyor 32 having two endless belts 36. The correlators 20 are configured for guiding a vehicle wheel onto the vehicle conveyor 32. It is desirable to align the position and orientation of the vehicle 28, and, thus, that of the wheels 24 of the vehicle 28, with a target lateral range TLR of each endless belt 36 of the vehicle conveyor 32. The target lateral range TLR for each endless belt is selected to position a corresponding one of the wheels 24 entirely on the endless belt 36 to avoid contact with laterally adjacent structures and surface as the vehicle 28 is moved along a vehicle path VP on the vehicle conveyor 32.

Figure 2:
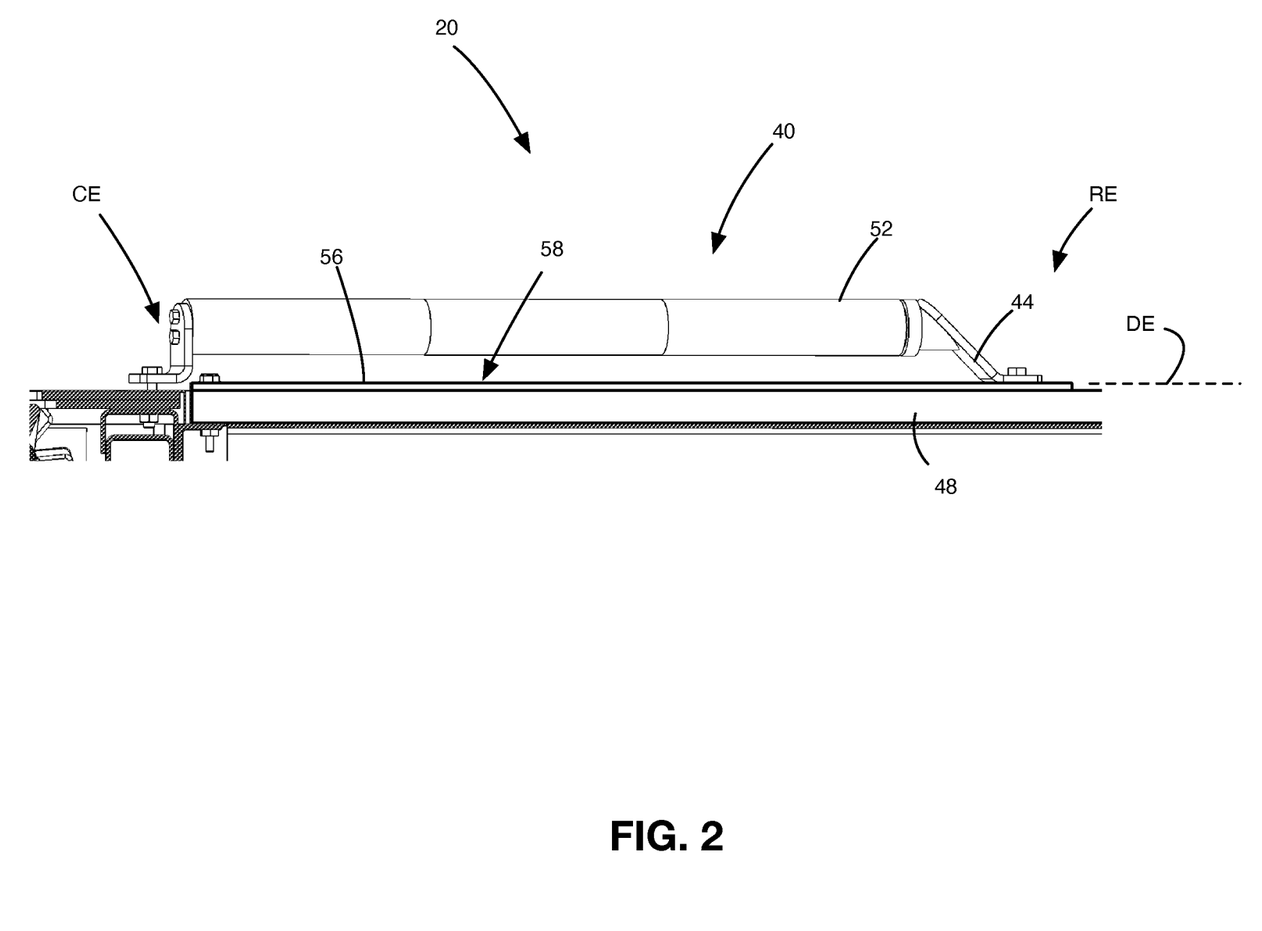
FIG. 2 is a side section view of the correlator system along 2-2 in FIG. 1.

Referring now to FIGS. 1 and 2, each correlator 20 is shown including at least one guide structure configured to receive a wheel 24 of a vehicle 28 at a receiving end RE of the correlator 20 and restrict lateral movement of the wheel 24 towards a conveyor-interfacing end CE of the correlator 20. In the illustrated embodiment, the correlator 20 includes two guide structures in the form of guide roller assemblies 40. Each guide roller assembly 40 includes a roller support 44 that is mounted to a surface such as a floor structure 48 or other suitable surface. The roller support 44 has at least one guide roller 52 that is mounted on it. The guide roller assembly 40 can be made of any suitable material that is suitably rigid to resist deformation. Where the correlators 20 are deployed in a vehicle wash environment, preferably the guide roller assembly 40 can withstand operating in a wet or humid environment. Suitable materials for the roller support 44 and the guide roller 52 can include, for example, galvanized steel, stainless steel, and aluminum. The at least one guide roller 52 are generally freely rotatable about a rotation axis RA. In order to enable this free rotation, the guide roller 52 can be mounted on the roller support 44 via ball bearings, a UHMW bushing, etc. that are capable of withstanding the compressive forces under load when the wheel 24 of the vehicle 28 impinges upon or rests upon it. In the illustrated embodiment, there is one guide roller 52.

In order to restrict lateral movement of the wheel 24 towards the target lateral range TLR at the conveyor-interfacing end CE of the correlators 20, the guide roller assemblies 40 are positioned obliquely to funnel the wheel 24.

Each of the correlators 20 includes a wheel support surface 56 extending from the at least one guide structure between the receiving end RE and the conveyor-interfacing end CE over which the wheel 24 of the vehicle 28 travels. The wheel support surface 56 can be provided on a deck. The wheel support surface 56 has a surface region 58 having surface properties selected such that a coefficient of friction between the surface region and tire rubber is sufficiently low to prevent the wheel from having sufficient traction on the surface region to enable climbing of the wheel onto the at least one guide structure.

In an embodiment, the surface region has surface properties selected such that the coefficient of friction between the surface region and the tire rubber is lower than 0.3. Preferably, the surface region has surface properties selected such that the coefficient of friction between the surface region and the tire rubber is lower than 0.25. More preferably, the surface region has surface properties selected such that the coefficient of friction between the surface region and the tire rubber is lower than 0.2. It has been found that when the surface region 58 has a coefficient of friction with tire rubber that is sufficiently low, the tire is effectively inhibited from applying sufficient traction force against the surface region 58 to enable the tire to climb up onto the guide roller assemblies 40. Instead, the tire slips against the surface region 58, thus enabling effective guiding of the wheel 24 by the guide roller assemblies 40.

In the illustrated embodiment, the wheel support surface 56 is made at least partially of low friction ultra high molecular weight polyethylene (UHMW) and extends between the pair of guide roller assemblies 40 for each wheel 24. UHMW is an extremely tough plastic with high abrasion and wear and chemical resistance. Preferably, the wheel support surface 56 extends across at least the portion of a ground surface across which the wheel 24 of the vehicle 28 is expected to traverse. In the illustrated embodiment in FIG. 1, the wheel support surface 56 extends along the ground surface at least substantially between the lateral positions of the guide roller assemblies 40. In another embodiments, a single deck can provide the wheel support surfaces 56 of the two correlators 20, or each wheel support surface can include two or more panels that are fitted together sufficiently closely to act as a single wheel support surface.

While UHMW by itself provides a low coefficient of friction with tire rubber, it has been found that by using UHMW blended with low friction additives, such as molybdenum disulfide, the durability of the wheel support surfaces 56 can be increased. In other embodiments, any material having a coefficient of friction with tire rubber that prevents sufficient traction of the wheel with the surface region to enable climbing of the wheel onto the at least one guide structure and that is suitable for providing a travel surface for a wheel can be employed. In other embodiments, the surface region of the wheel support surface can be made of a polymer, such as UHMW, a polymer with additives, polytetrafluoroethylene, etc.

As the wheel 24 traverses from the receiving end RE to the conveyor-interfacing end CE, the lateral range of motion is incrementally restricted. If the wheel 24 is misaligned with the target lateral range TLR of the vehicle conveyor 32, the wheel 24 will contact one of the guide roller assemblies 40. The guide rollers 52 of the guide roller assemblies 40 are elevated at least partially above an elevation DE of a top surface of the wheel support surface 56. The guide rollers 52 thus inhibit continued travel of the wheel 24 along a trajectory that is not directed to the target lateral range TLR at the conveyor-interfacing end CE of the correlator 20. Deformation of the wheel 24 against one of the guide rollers 52 urges the wheel 24 laterally towards the target lateral range TLR. As the load borne by the wheel 24 is primarily on the wheel support surface 56 which has a very low coefficient of friction, the force of the deformation of the wheel 24 against the guide roller 52 is greater than the force of friction between the wheel 24 and the wheel support surface 56, enabling lateral sliding of the wheel 24 over the surface of the wheel support surface 56 towards the target lateral range TLR.

A pair of lateral rails 38 positioned along each of the endless belts 36 towards the correlators 20 ensures that the wheels 24 are positioned within the target lateral range TLR.

Figure 3:
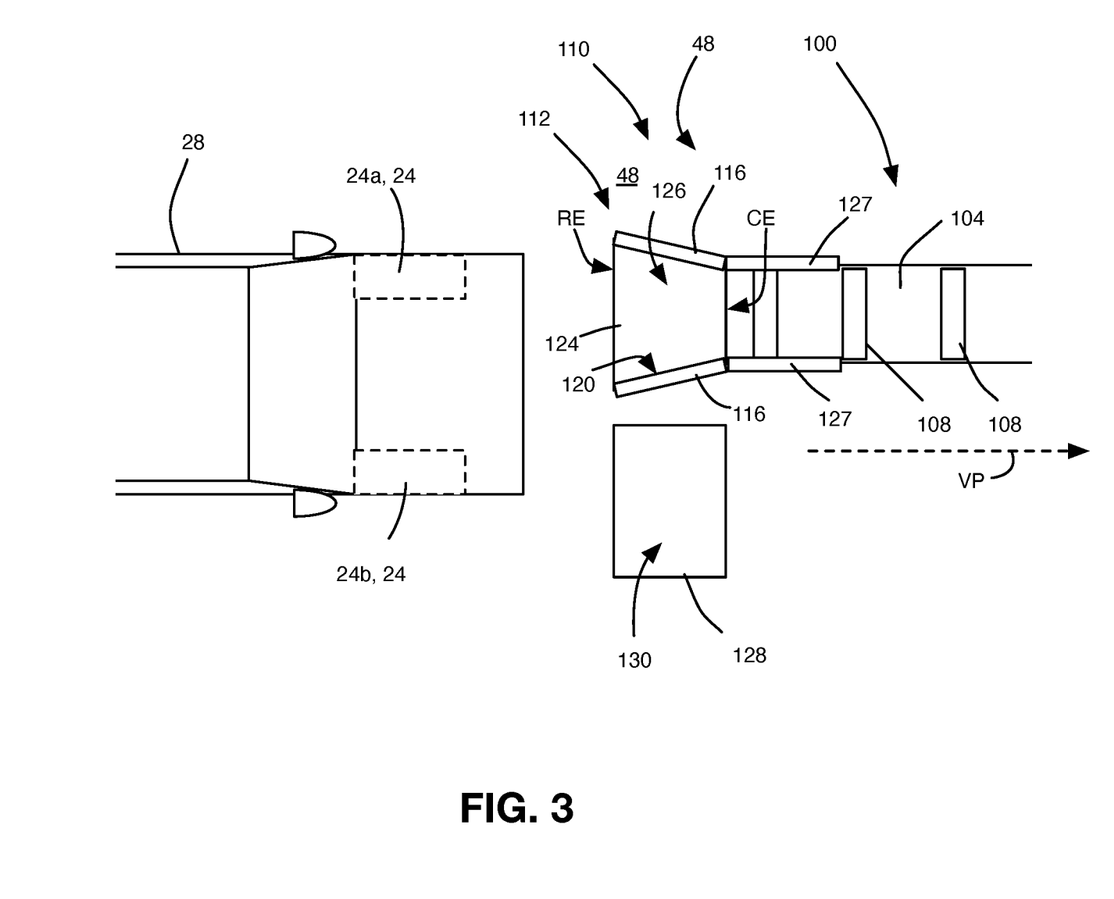
FIG. 3 is a top schematic view of a vehicle conveyor having a single chain drive, and a correlator system including a correlator for aligning a driver-side (left in the illustrated embodiment) wheel of a vehicle and a polytetrafluoroethylene wheel support surface region for enabling lateral slippage of the passenger-side (right in the illustrated embodiment) wheel of the vehicle as the left wheel is being aligned via the correlator.

FIG. 3A shows a vehicle conveyor 100 having a single chain drive 104. The chain drive 104 includes a set of protrusions 108 that are dimensioned to engage and drive the driver-side wheels 24a (also referred to as the left wheels 24a or first wheels 24a) of the vehicle 28 forward. Although only one left wheel 24a of the vehicle 28 is illustrated in the figures (the left front wheel of the vehicle), the left rear wheel can also be engaged by and driven by the chain drive 104 so that the vehicle 28 is moved along a vehicle path VP. The operator of the vehicle 28 is directed to put the vehicle 28 into neutral, allowing the passenger-side wheels 24b (also referred to as the right wheels 24b or second wheels) to roll along the ground surface adjacent to the chain drive 104.

Now referring to FIG. 3, a correlator system 110 is shown including a correlator 112 positioned in front of the chain drive 104. The correlator 112 includes a pair of guide curbs 116 positioned along lateral sides of the expected path of the driver-side (left in the illustrated embodiment) wheels 24a of the vehicle 28. The guide curbs 116 are constructed to restrict lateral movement of the left wheels 24a as they move from a receiving end RE towards a conveyor-interfacing end CE of the correlator 112. In the illustrated embodiment, the guide curbs 116 have low-friction surfaces that extend upwardly above an elevation DE of a top surface of a wheel support surface 124 and over the top of the guide curbs 116. The wheel support surface 124 may be referred to as a first wheel support surface 124 as it is positioned to support the first wheels 24a of the vehicle 28. The guide curbs 116 inhibit travel of the left wheels 24a in a direction other than one which will take it to the target lateral range TLR at the conveyor-interfacing end CE of the correlator 112. The top surface of the wheel support surface 124 is selected to provide a surface region 126 having surface properties such that has a coefficient of friction between the surface region and tire rubber is sufficiently low to prevent the second wheel 24b from having sufficient traction on the surface region to enable climbing of the first wheel 24a onto the at least one guide structure and can be made of any suitable material as described above. The surface region 126 enables lateral slippage of the first wheels 24a of the vehicle 28 as the first wheels 24a are guided laterally by the guide curbs 116. Preferably, the surfaces of the guide curbs 116 have a very low coefficient of friction to inhibit climbing of the first wheels 24a of the vehicle 28 over the guide curbs 116. In the illustrated embodiment, the surfaces of the guide curbs 116 are made of UHMW. In other embodiments, the guide surfaces can be made of at least partially UHMW or any other suitable material having a suitably low coefficient of friction.

A pair of lateral rails 127 positioned along the lateral sides of the chain drive 104 towards the correlator 112 ensures that the left wheels 24a of the vehicle 28 are positioned within the target lateral range TLR on the chain drive 104.

The correlator system 110 also includes a second wheel support surface 128 positioned next to the correlator 112, which is positioned to support the second wheels 24b of the vehicle 28. The wheel support surface 128 enables lateral slippage of the corresponding right wheels 24b on the right lateral side of the vehicle 28 as the left wheels 24a are being aligned via the correlator 112. That is, if the left front wheel 24a is being aligned by the correlator 112, the wheel support surface 128 positioned under the right front wheel 24b enables slippage of the right front wheel 24b, thereby facilitating reorienting/repositioning of the vehicle 28 and inhibiting the right front wheel 24b from exerting a lateral frictional force that would help the left front wheel 24a climbing onto the guide curb 116.

Figure 4:
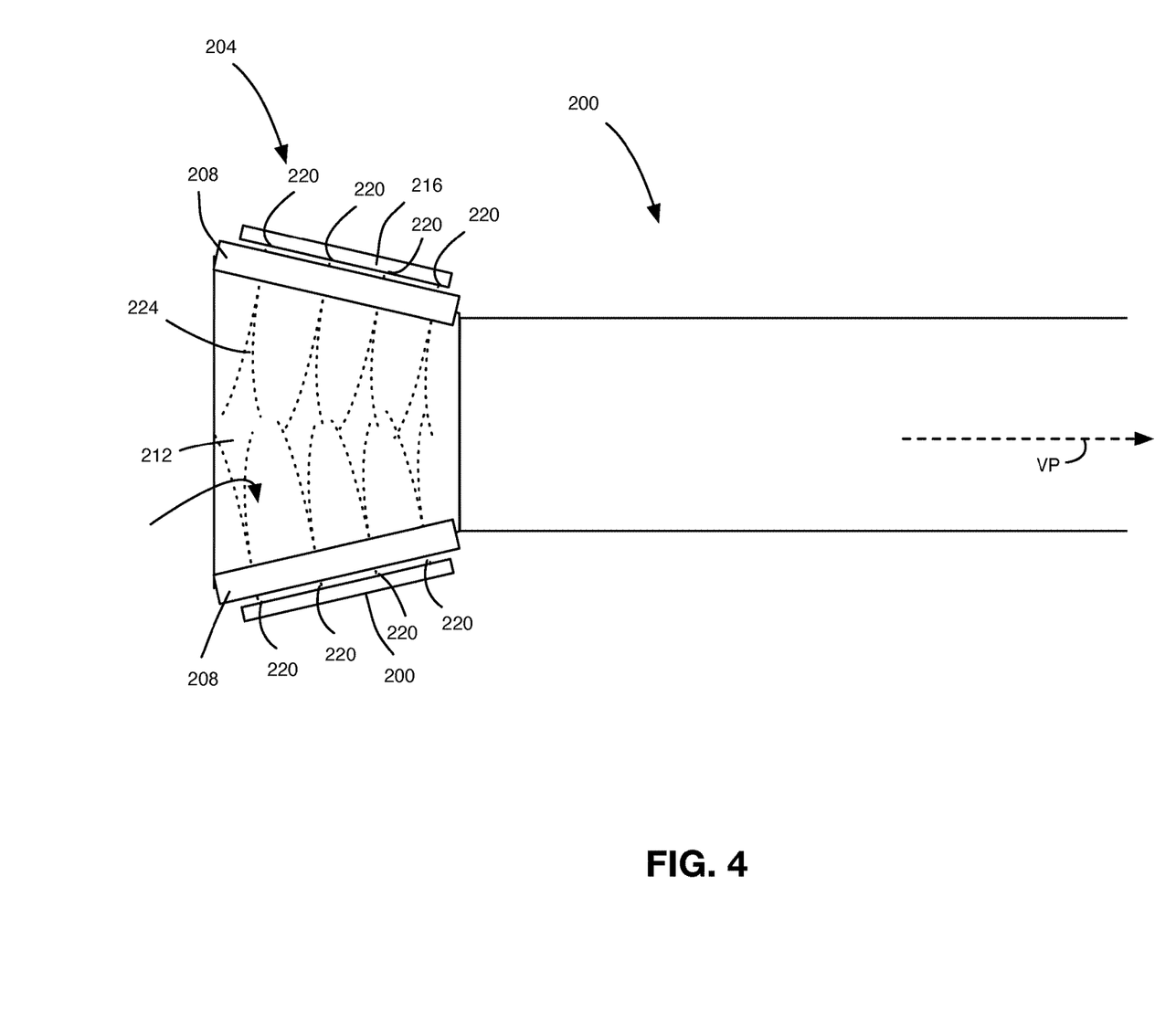
FIG. 4 is a top schematic view of a vehicle conveyor and a correlator in accordance with another embodiment, wherein a UHMW wheel support surface region is lubricated via spray nozzles oriented to direct a lubricating fluid on the UHMW wheel support surface region.

FIG. 4 is a top schematic view of a vehicle conveyor 200 for moving a vehicle along a vehicle path VP, and a correlator 204 in accordance with another embodiment. The correlator 204 includes a pair of guide roller assemblies 208 similar to those of FIGS. 1 and 2. A wheel support surface 212 extends between the guide roller assemblies 208 and provides a surface region 214 along its top surface.

The correlator 204 includes a lubrication system having two conduits 216, each with a set of nozzles 220 therealong. The conduits 216 are coupled to one or more lubricating fluid sources (such as reservoirs) that supply a lubricating fluid under pressure. The nozzles 220 are positioned to spray the lubricating fluid 224 onto the surface region 214.

By spraying a lubricating fluid 224 over the surface region 214, friction between wheels of vehicles and the surface region 214 can be reduced. Further, debris that can increase the traction between the wheel and the surface region 214 can be washed away by the lubricating fluid 224, thereby reducing the risk of gouging of the surface region 214 and maintaining a low coefficient of friction when a wheel of a car passes over the wheel support surface 212.

The lubricating fluid 224 can be any suitable fluid for reducing friction between wheels and the wheel support surface 212. In one embodiment, the lubricating fluid is water. In another embodiment, a surfactant such as a soap is added to the water to further reduce the friction between wheels and the wheel support surface 212. The soap assists in clearing the top surface of the wheel support surface 212 of debris, chemicals, and other residues.

Figure 5:
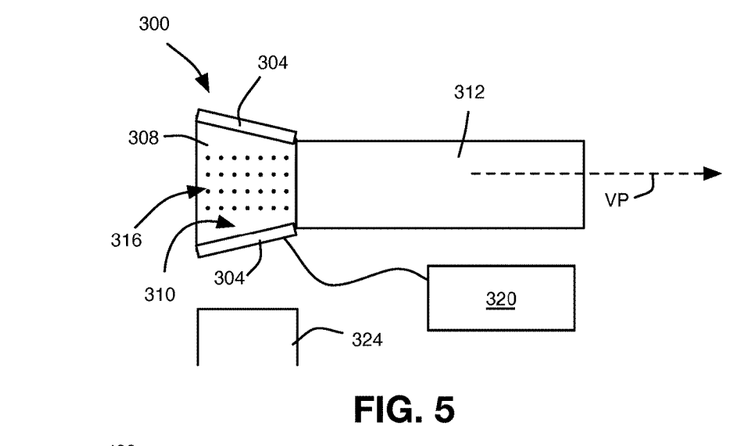
FIG. 5 is a top schematic view of a correlator in accordance with a further embodiment, where a wheel support surface region of the correlator has an array of apertures for introducing a lubricating fluid onto a top surface of the wheel support surface region.

FIG. 5 shows a correlator 300 in accordance with another embodiment, wherein the correlator 300 has two guide structures 304 and a first wheel support surface 308 extending between the guide structures 304 from a receiving end RE of the correlator 300 to a conveyor-interfacing end CE that is positioned adjacent to a vehicle conveyor 312 for moving a vehicle along a vehicle path VP. The wheel support surface 308 is preferably formed of or has a top layer made of a material that is sufficiently low friction so that a top surface providing a surface region 310 has a coefficient of friction with tire rubber that prevents sufficient traction of the wheel with the surface region to enable climbing of the wheel onto the guide structures 304. The top surface of the wheel support surface 308 can be made of any suitable material as described above.

The wheel support surface 308 has a set of apertures 316 that is in fluid communication with a lubricating fluid source 320 configured to dispense a lubricating fluid through the at least one aperture 316. The apertures 316 are sufficiently small to inhibit entry of debris, but sufficiently large to enable a flow of the lubricating fluid from the lubricating fluid source 320 over the top surface of the wheel support surface 308. Preferably, the at least one aperture 316 is an array of apertures 316 that are spaced to distribute the lubricating fluid over the surface region 310. A second wheel support surface 324 has a top surface that is made of a similar material as the top surface of the wheel support surface 308 and facilitates lateral slippage of the passenger-side wheel.

Figure 6A:
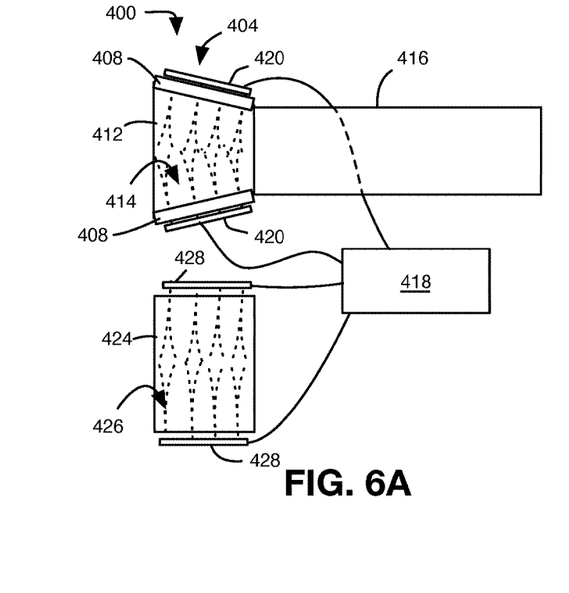
FIG. 6A is a top schematic view of a vehicle conveyor, a correlator, and a second wheel support surface, where the wheel support surface of the correlator and the second wheel support surface are lubricated via spray nozzles oriented to direct a lubricating fluid on the UHMW regions.

FIG. 6A shows a correlator system 400 in accordance with another embodiment having a correlator 404 similar to that of FIG. 4. The correlator 404 has a pair of guide structures 408 between which is positioned a wheel support surface 412. The guide structures 408 are positioned to guide a wheel onto a vehicle conveyor 416. The wheel support surface 412 is preferably formed of or has a top layer made of a material that is sufficiently low friction so that a top surface providing a surface region 414 has a coefficient of friction with tire rubber that prevents sufficient traction of the wheel with the surface region to enable climbing of the wheel onto the guide structures 408. The top surface of the wheel support surface 412 can be made of any suitable material as described above.

A conduit 420 is positioned at each lateral edge of the surface region 414 and has a set of nozzles that are positioned to spray a lubricating fluid over the surface region 414. The conduit 416 is in fluid communication with a lubricating fluid source 418.

A second wheel support surface 424 is provided beside the correlator 404, and has a top surface that is made of a similar material as the top surface of the first wheel support surface 412 to facilitates lateral slippage of the passenger-side wheel. Like the wheel support surface 412 of the correlator 404, the top surface of the second wheel support surface 424 provides a surface region 426 that is lubricated via a pair of flanking conduits 428 having a set of nozzles positioned to spray a lubricating fluid over the additional surface region 426. Preferably, the conduits 428 with the nozzles have a low profile to reduce the risk of damage from a vehicle wheel.

Figure 6B:
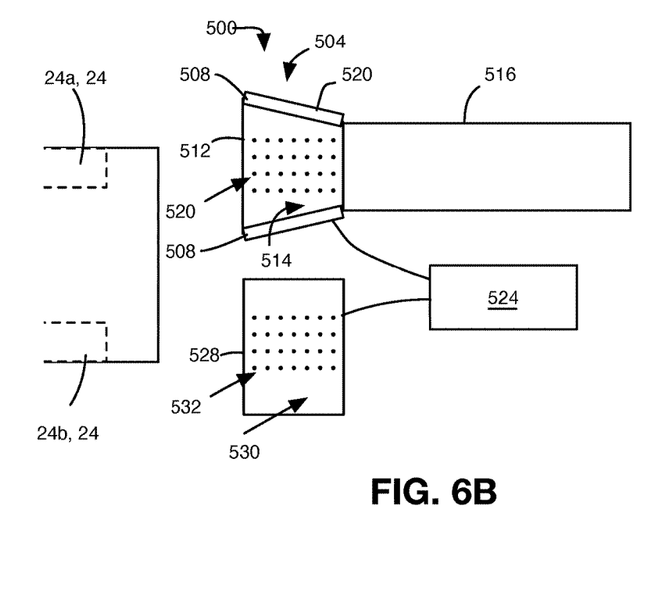
FIG. 6B is a top schematic view of a vehicle conveyor, a correlator, and a second wheel support surface, where the wheel support surface of the correlator and the second wheel support surface each have an array of apertures for introducing a lubricating fluid onto a top surface of the second wheel support surface.

FIG. 6B shows a correlator system 500 in accordance with a further embodiment having a correlator 504 similar to that of FIG. 5. For illustrative purposes a front end of the vehicle 28 is also shown in FIG. 6B. The correlator 504 has a pair of guide structures 508 between which is positioned a first wheel support surface 512. The guide structures 508 are positioned to guide a wheel onto a vehicle conveyor 516. The wheel support surface 512 is preferably formed of or has a top layer made of a material that is sufficiently low friction so that a top surface providing a surface region 514 has a coefficient of friction with tire rubber that prevents sufficient traction of the wheel with the surface region to enable climbing of the wheel onto the at least one guide structure to inhibit the vehicle climbing atop of the guide structures 508.

The wheel support surface 512 has a set of apertures 520 that is in fluid communication with a lubricating fluid source 524 configured to dispense a lubricating fluid through the set of apertures 520 onto the surface region 514. The apertures 520 are sufficiently small to inhibit entry of debris, but sufficiently large to enable a flow of the lubricating fluid from the lubricating fluid source 524 over the surface region 514. Preferably, the set of apertures 520 is an array of apertures that is spaced to distribute the lubricating fluid over the surface region 514.

A second wheel support surface 528 (which may be made from UHMW or some other suitable material) is provided beside the correlator 504. Like the UHMW wheel support surface 512 of the correlator 504, the UHMW wheel support surface 512 has a set of apertures 532 that are in fluid communication with the lubricating fluid source 524. The lubricating fluid is expressed through the set of apertures 532 to lubricate the top surface of the UHMW wheel support surface 528.

While the guide structures in the above-described and illustrated embodiments are shown having certain forms, any guide structure that is configured to receive a wheel of a vehicle at a receiving end of a correlator and restrict lateral movement of the wheel towards a conveyor-interfacing end of the correlator can be employed.

While in the above-described and illustrated embodiments, the correlators employ two guide structures to guide a wheel of a vehicle, in other embodiments, it is possible to use a single guide structure and direct an operator of the vehicle to slightly steer the vehicle towards the guide structure. The single guide structure can then guide the wheel towards the target lateral range.

Any other suitable means for lubricating the UHMW wheel support surface(s) can be employed with the correlator systems disclosed herein.

While, in the above-illustrated embodiments, the positioning of the correlators is described with reference to the driver side and/or the passenger side of a vehicle, or the left side and/or the right side of the vehicle, it will be appreciated that the position(s) of the correlator(s) and decks illustrated can be reversed.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

LIST OF REFERENCE NUMERALS 20 correlator
24 wheel
28 vehicle
32 vehicle conveyor
36 endless belt
38 lateral rail
40 guide roller assembly
44 roller support
48 floor structure
52 guide roller
56 wheel support surface
58 surface region
100 vehicle conveyor
104 chain drive
108 protrusion
110 correlator system
112 correlator
116 guide curb
124 first wheel support surface
126 surface region
127 guide rail
128 second wheel support surface
130 surface region
200 vehicle conveyor
204 correlator
208 guide roller assembly
212 wheel support surface
214 surface region
216 conduit
220 nozzle
224 lubricating fluid
300 correlator
304 guide structure
308 first wheel support surface
310 surface region
312 vehicle conveyor
316 apertures
320 lubricating fluid source
324 second wheel support surface
400 correlator system
404 correlator
408 guide structure
412 first wheel support surface
414 surface region
416 vehicle conveyor
418 lubricating fluid source
420 conduit
424 second wheel support surface
426 surface region
428 conduit
500 conduit system
504 correlator
508 guide structure
512 first wheel support surface
514 surface region
516 vehicle conveyor
520 apertures
524 lubricating fluid source
528 second wheel support surface
530 additional surface region
532 apertures
CE conveyor-interfacing end
DE deck elevation
RA rotation axis
RE receiving end
TLR target lateral range
VP vehicle path

What is claimed is:

1. A correlator for guiding a vehicle onto a vehicle conveyor having a conveyor axis, comprising:
a wheel support surface defining a receiving end of the correlator and a conveyor-interfacing end of the correlator that is aligned with the vehicle conveyor, wherein the wheel support surface is positioned to support a wheel of the vehicle as the wheel rolls thereon from the receiving end towards the conveyor-interfacing end; and
at least one guide structure positioned to guide a wheel of the vehicle laterally during travel of the wheel on the wheel support surface from the receiving end towards the conveyor-interfacing end,
wherein the wheel support surface has a surface region having surface properties selected such that a coefficient of friction between the surface region and tire rubber is sufficiently low to prevent the wheel from having sufficient traction on the surface region to enable climbing of the wheel onto the at least one guide structure, the surface region is at least partially made of an ultra-high molecular weight (UHMW) polyethylene and an additive is added to the UHMW polyethylene to decrease the coefficient of friction of the surface region.

2. The correlator of claim 1, wherein the coefficient of friction is lower than 0.3.

3. The correlator of claim 2, wherein the coefficient of friction is lower than 0.25.

4. The correlator of claim 3, wherein the coefficient of friction is lower than 0.2.

5. The correlator of claim 4, wherein the surface region is at least partially made of polytetrafluoroethylene.

6. The correlator of claim 4, further comprising a lubrication system for lubricating the surface region.

7. The correlator of claim 6, wherein the lubrication system includes at least one nozzle positioned to spray a lubricating fluid onto the wheel support surface.

8. The correlator of claim 6, wherein the lubrication system includes at least one aperture in the wheel support surface, in fluid communication with a lubricating fluid source configured to dispense a lubricating fluid through the at least one aperture.

9. The correlator of claim 7, wherein the lubricating fluid includes a surfactant.

10. A correlator for guiding a vehicle onto a vehicle conveyor having a conveyor axis, comprising:
a wheel support surface defining a receiving end of the correlator and a conveyor-interfacing end of the correlator, wherein the wheel support surface is positioned to support a wheel of the vehicle as the wheel rolls thereon from the receiving end towards the conveyor-interfacing end;
at least one guide structure positioned to guide a wheel of the vehicle laterally during travel of the wheel on the wheel support surface from the receiving end towards the conveyor-interfacing end; and
a lubrication system positioned to supply a lubricating fluid on top of a surface region of the wheel support surface, such that a coefficient of friction between the surface region and tire rubber is sufficiently low to prevent the wheel from having sufficient traction on the surface region to enable climbing of the wheel onto the at least one guide structure.

11. The correlator of claim 10, wherein the lubrication system includes at least one nozzle in fluid communication with a lubricating fluid source and positioned to spray the lubricating fluid onto the surface region.

12. The correlator of claim 10, wherein the lubrication system includes at least one aperture in the surface region in fluid communication with a lubricating fluid source configured to dispense the lubricating fluid through the at least one aperture.

13. The correlator of claim 10, wherein the lubricating fluid includes a surfactant.

14. A correlator system for guiding a vehicle onto a vehicle conveyor having a conveyor axis, wherein the vehicle has at least a first wheel on a first lateral side of the vehicle, and a second wheel on a second lateral side of the vehicle, the correlator system comprising:
a correlator having a receiving end and a conveyor-interfacing end that is aligned with the vehicle conveyor, and at least one guide structure positioned to guide the first wheel of the vehicle laterally during rolling of the first wheel from the receiving end towards the conveyor-interfacing end; and
a wheel support surface positioned to support the second wheel as the first wheel rolls from the receiving end of the correlator towards the conveyor-interfacing end of the correlator,
wherein the wheel support surface has a surface region having surface properties selected such that a coefficient of friction between the surface region and tire rubber is sufficiently low to prevent the second wheel from having sufficient traction on the surface region to enable climbing of the first wheel onto the at least one guide structure, the surface region is at least partially made of polytetrafluoroethylene.

15. The correlator of claim 14, wherein the coefficient of friction is lower than 0.3.

16. The correlator of claim 15, wherein the coefficient of friction is lower than 0.25.

17. The correlator of claim 16, wherein the coefficient of friction is lower than 0.2.

18. The correlator system of claim 17, wherein the surface region is at least partially made of a polymer.

19. The correlator system of claim 18, wherein the polymer is an ultra high molecular weight (UHMW) polyethylene.

20. The correlator system of claim 19, wherein an additive is added to the UHMW polyethylene to decrease the coefficient of friction of the surface region.

21. The correlator system of claim 17, further comprising a lubrication system for lubricating the surface region.

22. The correlator system of claim 21, wherein the lubricating system includes at least one nozzle positioned to spray a lubricating fluid onto the wheel support surface region.

23. The correlator system of claim 21, wherein the lubricating fluid includes a surfactant.

24. A correlator system for guiding a vehicle onto a vehicle conveyor having a conveyor axis, wherein the vehicle has at least a first wheel on a first lateral side of the vehicle, and a second wheel on a second lateral side of the vehicle, the correlator system comprising:
a correlator having a receiving end and a conveyor-interfacing end that is aligned with the vehicle conveyor, and at least one guide structure positioned to guide the first wheel of the vehicle laterally during rolling of the first wheel from the receiving end towards the conveyor-interfacing end;
a wheel support surface positioned to support the second wheel as the first wheel rolls from the receiving end of the correlator towards the conveyor-interfacing end of the correlator; and
a lubrication system positioned to supply a lubricating fluid on top of a surface region of the wheel support surface, such that a coefficient of friction between the surface region and tire rubber is sufficiently low to prevent the second wheel from having sufficient traction on the surface region to enable climbing of the first wheel onto the at least one guide structure.

25. The correlator of claim 24, wherein the lubrication system includes at least one nozzle in fluid communication with a lubricating fluid source and positioned to spray the lubricating fluid onto the surface region.

26. The correlator of claim 24, wherein the lubricating fluid includes a surfactant.

* * * * *